June 28, 1966   O. J. MUNZ   3,258,775
THREE-DIMENSIONAL VOLUMETRIC DRAWING, DATA REPRESENTATION
AND RECORDING SYSTEMS
Original Filed Jan. 30, 1956   5 Sheets-Sheet 1

INVENTOR.
Otto John Munz.

June 28, 1966            O. J. MUNZ            3,258,775

Fig. 4

INVENTOR.
Otto John Munz.

June 28, 1966     O. J. MUNZ     3,258,775
THREE-DIMENSIONAL VOLUMETRIC DRAWING, DATA REPRESENTATION
AND RECORDING SYSTEMS
Original Filed Jan. 30, 1956     5 Sheets-Sheet 4

INVENTOR.
Otto John Munz.

June 28, 1966     O. J. MUNZ     3,258,775
THREE-DIMENSIONAL VOLUMETRIC DRAWING, DATA REPRESENTATION
AND RECORDING SYSTEMS
Original Filed Jan. 30, 1956     5 Sheets-Sheet 5

Fig. 14

INVENTOR.
Otto John Munz.

United States Patent Office 3,258,775
Patented June 28, 1966

3,258,775
THREE-DIMENSIONAL VOLUMETRIC DRAWING, DATA REPRESENTATION AND RECORDING SYSTEMS
Otto John Munz, Harness Creek View Drive, Annapolis, Md.
Original application Jan. 30, 1956, Ser. No. 562,134. Divided and this application Sept. 29, 1965, Ser. No. 491,079
42 Claims. (Cl. 346—1)

The present invention is a division of copending U.S. patent application Serial No. 562,134, filed January 30, 1956, for three dimensional drawing and data recording systems.

This invention relates to apparatus for and method of making three-dimensional permanent or transient traces, such as writings, paintings, recordings, representations and similar markings, hereinafter called glyphs, within a container, hereinafter called glyph-matrix, filled with a transparent fluid, for visual inspection or other use.

The present invention in particular relates to the glyph-container-matrix, to the styli means required for glyph production, to the various fluids supporting the styli and the glyphs in the matrix, hereinafter called glyph carriers, to the actual means which create the glyph, hereinafter called glyph forming medium, to the housings for matrixes and to various methods of producing glyphs.

The present invention is useful for instance for recording physical phenomena, which can advantageously be represented in space in the shape of three-dimensional bodies, curves and other markings, relative to a frame of references. Recording devices are known, which provide a continuously drawn written record of the variations of temperature, pressure, volume delivery, ratio of delivered volumes, current voltage or wattage values, generated electromotive forces, and the like, with respect to the control of a particular physical, electrical, chemical or mechanical operation. The use of circular or rectangular graphical charts for recording control data in semi-automatic or automatic operations in industry is well known. Generally, in each of these uses, there is employed a conventional phenomena-sensing means or detector for determining with respect to a standardized set of coordinates, in which the units of interest are indicated, variations of the particular physical force which is being measured. The variations usually are recorded by an indicating device actuated through a cooperating mechanism from the sensing means to provide a record of the variations of the physical condition in time.

Heretofore, recording has been technically limited to recording equipment for scribing the record in two dimensions on a surface or chart. In view of the introduction of a recording container and of a record supporting mass in cooperation with the independent controls in each coordinate axis which are permitted by the apparatus and methods of the present invention, there are provided here advantageous unprecedented new results such as a three-dimensional body-record in a container-matrix.

The invention provides a stylus means which is actuated separately with respect to any of three or four sets of phenomena to produce a correlated body-record in space, which may be related to a set of three-dimensional coordinates and time or space. The number of variables which are used to move the stylus means of the present invention simultaneously is limited to three. Where certain of the forces are forces which themselves are compounded as a product of other forces, for example, momentum, torque, inertia and other physical phenomena, then additional forces beyond three may be measured with the system of the present invention. The variation of these compound forces in terms of some symbol single variable such as time, distance, pressure and the like, can serve as another sensing device which, through its actuating means, is operable to effect the independent movement of the stylus.

The principal object of the invention is to provide methods and apparatus for the production of a glyph, diaglyph, a glyph-chart, a glyph-record, a glyph-plot, a photo-glyph, a glyph-sketch, a glyph-drawing, a glyph-design, a glyph-print, a glyph painting, a teleglyph and similar as a three-dimensional counterpart of a graph, diagram, tabulated information chart, graphical record, graphical plot, photograph, sketch, drawing, design, print, painting, or television respectively.

Another object of the present invention is to provide a method of and apparatus for display of information such as values of mathematical functions or relative positions of physical objects in a transient form in three dimensions by the positioning of a stylus relative to three orthogonal reference axes.

Still another object of the present invention is to provide a method for continuous glyph-recording of information in a transient or in a more or less permanent form in three dimensions by a stylus leaving traces of its movements in a glyph record carrier for instance within a transparent container.

Yet another object of the present invention is to provide a recording method in a manner enabling the reading of the components of the glyph information in three dimensions by incorporating fiduciary marks, grids, references, graduations or other units significant of the objects displayed or represented.

Another object of the invention is to add to the above glyph display indicia of still another function, the units of which are representative of a fourth dimension such as of time or of other variables, which may be time or position dependent. The addition of a fourth variable to the three-dimensional display allows indication of functions of four variables such as the space-time equations of the Einstein special relativity theory.

Another object of the invention is to provide novel apparatus, methods and operating means for the production of three-dimensional permanent or transient recordings which utilize a recording assembly including a matrix-housing therefor, a recording carrier and a recording stylus universally movable therein, responsive to actuating means from devices for the sensing of phenomena and which apparatus and method of operation is capable of providing a record in three dimensions, which optionally may be related to a frame of references to determine the quantitative and qualitative characteristics of the phenomena sensed.

A further object of the invention is to obtain a permanent glyph-record by providing novel recording means, either manually controllable or controllable through the employment of magnetic, electromagnetic or electrostatic forces to produce controlled levitating movements of a stylus within a recording medium, said stylus optionally provided with ink recording storage means which is capable of delivering ink to mark the medium while the stylus is moving.

Another object of the invention is to provide an assembly, including a matrix and a stylus movable therein, said matrix charged with a suitable carrier and said stylus equipped with glyph forming means, and means to move the stylus controllably within the matrix and to release its glyph forming means in its path to produce in cooperation with said carrier a fluorescent, phosphorescent or otherwise visible trace.

Another object of the invention is the provision of a manually controllable stylus.

Another object of the invention is the selection of suitable carriers and glyph forming media.

Another object of the invention is to provide a stylus with an ink-reservoir cartridge charged with a propellant to expel the ink under control.

Another object of the invention is the provision of a stylus-pen equipped with a propellant-charged ink in the form of a replaceable ink-reservoir, and with manual means to control the discharge output.

An object of the invention is to provide a graduated matrix charged with a transparent carrier and having means to introduce therein controllably a glyph forming means.

Another object of the invention is the provision of a transparent matrix charged with a transparent carrier and including at least one universally movable stylus equipped with glyph-forming means.

Another object of the invention is the provision of an expansible contractible matrix-cartridge which may be replaceably used within a glyph-housing equipped with stylus means.

Other and further objects will become apparent from the more detailed description and the drawings which are set forth in the application, it being understood that such further description and illustration is not limiting, since various changes may be made in the structures, methods and apparatus of the present invention by those skilled in the art without departing from the spirit and the scope of the present invention.

In the drawings:

FIG. 2 is an exploded perspective view of a manually operated stylus.

FIGS. 2a and b are the top and side views respectively to an enlarged scale of the nib of the stylus shown in FIG. 2.

FIG. 7 is a perspective view of a portion of a recorder described.

Figure 1:
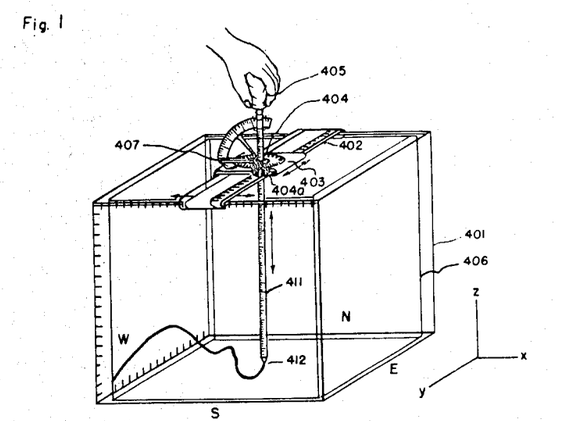
FIG. 1 is a perspective view of a manually operated glyph apparatus.

For purposes of developing an explantion of the principles of the present invention, reference is made to FIGURE 1 in which a manually operable recording apparatus is shown. Outer housing 401 is provided at its top with a stylus guide, said guide comprising a slotted slide 402, capable of sliding along the x-axis over the upper edge of the housing and a horizontal slide 403, adapted to slide along the y-axis over the upper edge of the x-slide. In the center of the two slides there is provided an orifice 404 within which a stylus 405 is mounted to be slidably movable along the z-axis, x axis and y axis simultaneously.

Figures 2, 2A, 2B, 7:
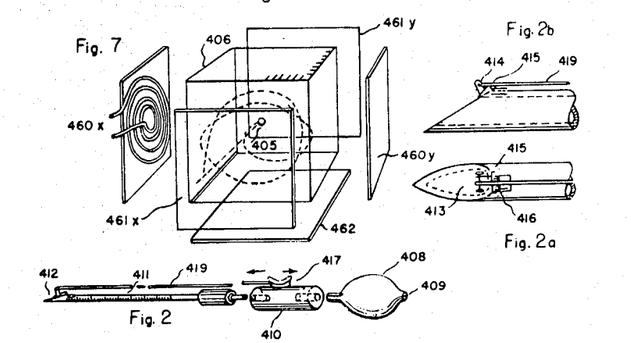

In FIGURE 2 a manually operable stylus is shown having an aspirating bulb 408, within which an inner valve is provided to permit ingress of air. When the bulb 408 is squeezed, it expels ink from the ink container 410. The ink container is removably fitted to the bulb 408 and a graduated end portion of the stylus 411 is provided in order to indicate the depth of the stylus within the housing along the z-axis. This graduated end portion fits slidably into the housing orifice 404.

If desired, an optional construction of the stylus provides a stylus-nib 412 and additional means 417 to control the size of the orifice, specifically illustrated in the figure as a fore-finger slider.

As shown in FIGS. 2a and 2b, the nib is tapered and optionally provided with a cap 413.

The cap 413 extends over the orifice into a yoke 414 and is hinged at 415 to the upper end of the stylus. The yoke of the cap is hinged to the fore-finger slider 417 by means of rod 419. The rod 419 is anchored to the top of graduated end portions of the stylus 411. By use of the arrangement of the fore-finger slider, release of ink from container 410 may be controlled by simple manual pressure, sliding tab 417 back and forth.

The cap is automatically closed by a spring loaded device 416 on the hinge 415. An increase in pressure releases a proportionally greater quantity of ink.

To fill the ink container, ink may be drawn in manually by the aspirating bulb or a replaceable cartridge may be introduced, provided with soft plastic material at its ends. If the cartridge of soft plastic material is employed, it is cut open at each end while being inserted, by the two sharp shanks, of the bulb and of the stylus, respectively.

The yoke of the cap at 416 is spring loaded to close the cap when not used. Upon operation of the fore-finger tap 410, the yoke is disengaged.

Figure 3:
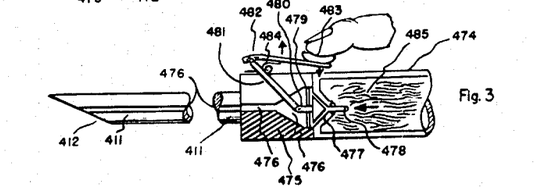
FIG. 3 is a view in vertical cross-section of a manually operated stylus equipped with a pressurized ink container and needle valve flow control.

In FIGURE 3 a squirt-type stylus is shown. The recording medium, such as ink, is enclosed in a pressurized flexible plastic cartridge, together with a highly volatile organic fluid propellant. The propellant may contain a non-ionic synthetic surface active wetting agent which foams in a water solution and assists recording. Such agents are cited for instance in U.S. Patents 2,524,590; 2,435,682; 2,659,704; 2,639,213, and may be employed with various inks and paints. The composition of inks, pigments, paints or other recording media of the liquid type may be blended with a propellant such as fluorine, chloro-fluorine, methane, ethyl chloride, dichlordifluor ethane, propane, Freon acetylene, and the like, which develop fluid pressure to squirt out the ink through a valve controlled orifice.

The stylus of FIGURE 3 is manually controlled. It has a casing 474, having an extension 411 ending with a nib 412. The extension 411 connects by channel 476 with the front interior of the casing 475, and ends in a valve seat 477 comprising a tubular knife 478. The interior of the casing provides a housing for a slidable cone like valve 479, cooperating with valve seat 477. The valve has an extension 480 hinged to arm 481 protruding through casing by a tight fit to slide under lever 482 ending in a forefinger tap 483. The lever is loaded by spring 484 to return the valve to closed position upon release of pressure by forefinger on tap. The cartridge 485 is cut open by being inserted into the casing under pressure against the tubular knife 478.

The type of stylus which is illustrated in FIG. 3 may be operated except for the presence of the addiitonal forefinger control freehand in the same manner as a fountain pen, and it may be used solely also for such a purpose without the stylus guiding means.

Returning now to FIGURE 1, means are provided, not shown, to open the skeleton of the housing and to permit the insertion and taking out of the container-matrix 406. The nib 412 is mounted for universal movements within the container along three coordinate axes by the slides as discussed above. Simultaneously or in the alternative, the nib may be mounted for movements along the polar coordinates by using a disc 407 which is fixed and centered over the orifice and provided with a ball bearing orifice 404a. The disc carries a horizontal graduation, and a vertical sector rotating over it for stylus alignment in the vertical directions. There may also be inserted through the orifices 404 the necessary means for filling the container.

The housing may optionally be provided with an orthogonal or polar set of coordinate references, and solar direction references upon the outer sides of the housing to identify location and quantity with respect to the physical phenomena being recorded in the medium.

As indicated in FIG. 1, the stylus itself is of a length which permits its nib to be inserted within the matrix to reach into the bottom corners of the matrix. Indentations may also be provided on the stylus to facilitate sliding positioning thereof along its graduated marks. A spring in the orifice 404 may be inserted to exert pressure against the indentation and to retard the sliding movement when a locked position is desired.

In the manner shown above, complete manual control of the stylus along orthogonal and/or polar coordinates may be achieved.

Figure 4:
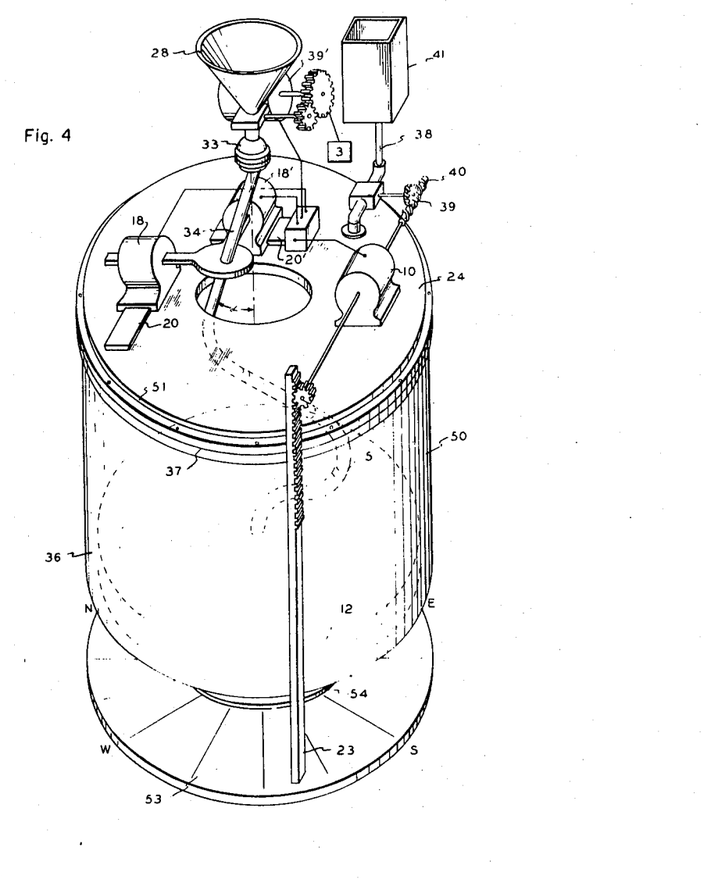
FIG. 4 is a perspective view of a mechanically operated glyph apparatus.

In FIG. 4 there is illustrated an arrangement for recording in an expansible container which is capable of either manual or automatic mechanical operation.

FIG. 4 illustrates another apparatus for performing the method of the invention. This apparatus also employs a glyph carrier in the recording space 50 to support the glyph record. The glyph recording elements are mounted on a fixed table frame 24. To this table is removably attached a cylinder-matrix 36, which is preferably transparent and which defines the recording space 50. The cylinder-matrix has a bottom slidable therein. In the cylinder moves a tightly fitting piston 12, adjacent to the cylinder bottom. The piston is controlled by control 10 through rack 23. A piston support 54 is shown movably connected to the table frame 24 by rack 23. At the start of the recording the piston is positioned in close proximity with the table frame and during the recording process it moves axially away from it. As it moves, it forms with the cylinder an expanding matrix. One or more glyph carriers stored in one or more tanks 41 are admitted to the matrix through inlet 38 controlled by a valve system 39 which in turn is controlled by the control 10. The control 10 simultaneously controls the expansion by piston and serves to keep the expanding matrix filled with the carrier. The recording head is shown here as a tube 34 movably connected to a universal joint 33. The material from which the glyph is to be formed is advanced from one or more funnels 28 through a valve system 39' controlled by an electric motor output 3 such as a synchro. A phenomenon detector provides electric input to the motor 3 which in turn will cause an opening or closing of the valve. The tube 34 is controlled by two other phenomena translators, such as servo-motors 18 and 18' and forms the material into a glyph by positioning it relative to a frame of references appended to the matrix. If the glyph cannot support itself, a transparent supporting mass is admitted into the matrix through valve mechanism 39. There may be a plurality of glyph-supporting masses stored in a plurality of tanks 41, the mass in each tank for instance having a different color transparency. Thus a sequence of variously colored transparent layers may be superimposed in a predetermined sequence, indicative for instance of time, or variegated heat-conditions, altitude changes, etc. Or while one of the tanks may carry a photo-emulsion, others may carry photo-processing materials, such as developer, and fixer. An invention on photo-glyph recording, utilizing these features of the present invention is covered in my aforesaid U.S. Patent No. 2,775,758.

There may be a plurality of funnels 28, each dispensing a different glyph forming medium or material. Thus again different markings o fthe glyph record may be accomplished, indicative of time, quantity, quality, condition or other phenomena desired to be included in the glyph-record.

In photo-glyph recording a transparent solidifiable mass such as gelatine, methyl methacrylate or other materials mentioned hereinafter as suitable glyph-supporting carriers, may carry dispersed therein a positive photosensitive emulsion, such as silver iodine, bichromated gelatin, etc. In this embodiment of the invention the expansible container of FIG. 4, fully expanded, is prefilled with the carrier with the emulsion dispersed within it. Simultaneously at least 2 sets of capsules or globules are dispersed within the carrier. The first set of capsules contains a developer, specific to the photo-emulsion used in the carrier to develop a positive image. This is for instance a tanning developer for the silver iodine material, or an acrylic emulsion for the bichromated gelatin. A second set of capsules of globules contains the fixing medium specific to the photo-emulsion selected. The developer-capsules have small surface strength and rupture immediately upon the exercise of a first small pressure upon the carrier by the piston 12 of FIG. 4. Subsequently, upon completion of the development, the second set of the capsules is ruptured exploded upon the exercise of a predetermined higher pressure by the piston 12 upon the contents of the matrix. Additional sets of capsules carrying additional materials necessary or desirable for the photo-processing and solidification of the selected photo-sensitive materials, each having a higher resistance to rupture upon pressure than the preceding set had, may be included. Thus, step by step, by increasing pressure upon the contents of the matrix a complete photo-processing may be accomplished of a whole body of a photo-sensitive transparent mass. This allows for a novel method of photo-glyph-recording by exposing a transparent container prefilled with a photo-sensitized material, rather than by photo-processing layers of photo-emulsion, as disclosed in applicant's U.S. Patent Number 2,775,758, already cited. The capsules or globules of photo-processing materials are known to the art, as disclosed for instance by Land, U.S. Patent No. 2,543,161.

Figures 5, 6:
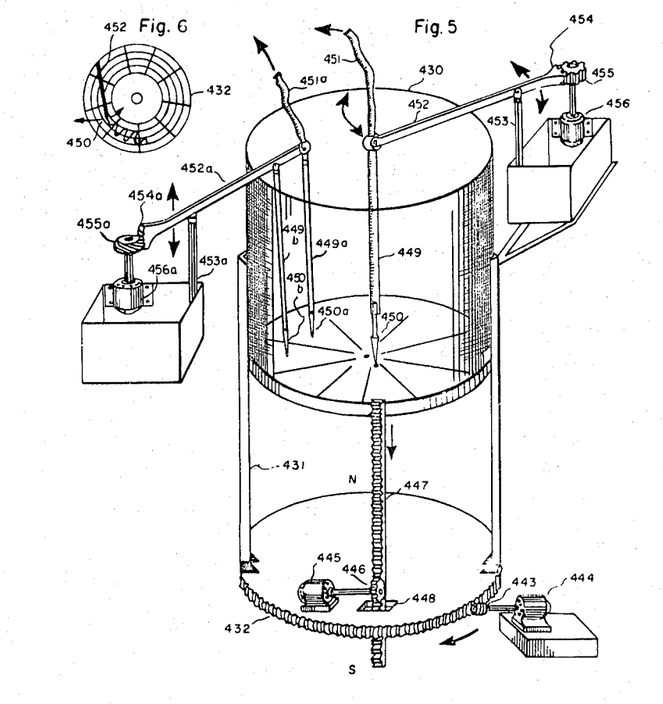
FIG. 5 is a perspective view of a glyph recording apparatus for charting a plurality of associated phenomena.
FIG. 6 is top plan view to a reduced scale of the apparatus shown in FIG. 5.

FIGURES 5 and 6 show a glyph-recording apparatus of the type employing a rotating record chart type carrier with the stylus moving from center to periphery and back. The present invention substitutes for the two-dimensional paper chart a three-dimensional matrix in the shape of container 430, filled with a transparent carrier to support the glyph. The matrix is vertically slidable in a glyph-housing 431, having a turntable base 432, provided on the periphery with teeth, meshing with wormgear 433 of motor 444. On the base is mounted a vertical motor control of the matrix, shown by motor 445 engaging by gear 446 rack 447. The rack recedes downward through opening 448 in base, thus permitting the matrix to slide downwards away from the recording stylus 449. The stylus comprises a vertical ink-dispensing rigid tube portion ending in a nib 450, which at the beginning of recording is positioned at the bottom of the matrix. On the opposite side the stylus extends through a flexible pipe 451 into an ink reservoir, which may be equipped with a valve system permitting control over the supply of ink to the stylus. The rigid portion of the stylus is rigidly mounted to a horizontal arm 452 mounted on pivot 453 actuated by horizontal toothed segment 454 for reciprocating movements between the periphery of the matrix and near center. The segment 454 engages the gear 455 of the vertical axis motor 456, which is reversible. The glyph recording is produced by the relative movements between the rotating receding matrix and the reciprocating stylus as the stylus discharges an ink trace into the transparent carrier. A vertical reference information may be simultaneously recorded by a second vertical stylus in analogy to that already shown as 449, except that the second stylus is centered in the matrix, has no reciprocating movements and has its flow of ink periodically interrupted to provide vertical graduation marks. A horizontal reference system may be drawn into the carrier by one or more additional styli, shown as 449a and 449b, which are constructed similarly to stylus 449, having nibs 450a and 450b and a connection to ink reservoir by tube 451a. While the matrix recedes, the dispensing styli 449a and 449b follow its downward movements, being lowered at the same rate of speed by reciprocating motor 456a through worm gear 455a, which engages vertical segment gear 454a on arm 452a over pivot 453a. Upon completion of one turn of the turntable 432, the ink supply to 451a is disconnected, the styli 449a and 449b are pulled up into a predetermined higher recording position, the ink supply is again turned on and the styli are dispensing ink for another complete rotation. Thus during each recording rotation, the styli 459a and 459b each draws complete circles within the matrix at a sequence of levels predetermined as a graduation in a horizontal frame of references.

In FIG. 7 a matrix 406 is shown positioned within two pairs of radiation generators, such as of magnets, of electro-magnets, of electro-static plates, or of electrical coils in the $x$ and $y$ axes 460, 461 above a single magnet, electro-magnet, coil, or electro-static plate 462 in the $z$ axis. A field force responsive levitating stylus 405 comprising a material responsive to the selected radiation generators, such as a magnetically permeable, conductive or dielectric material, respectively, or a magnet or electret, or at least one short circuited electro-conductive coil, or other material movable in response to the outside controls is moved within the matrix by magnetic, electro-magnetic, electro-static or other radiations employed in a system, such as described in the above cited copending U.S. Patent No. 2,911,538 on Linear Motor Control.

Thus levitating type styli, leaving traces of their movements may be employed to produce a permanent or transient glyph trace. These features of the invention will be discussed hereinafter in connection with various types of styli, and glyph forming means and carriers. For the purposes of production of permanent glyphs within a matrix filled with a transparent viscous carrier several embodiments of styli are shown in FIGS. 8 to 13. All these styli have the following features in common: means responsive to the magnetic or other forces, which are to control their movements, such as permeable or electro-conductive bodies, magnets or electrets, means to make the styli buoyant, such as a hollow core, an ink reservoir, and means to discharge the ink or other fluid.

The levitation of the stylus itself may be obtained by electro-magnetic radiations, or by imparting to the stylus a neutral buoyancy in a liquid carrier, or by suspending it in a carrier, the shear resistance of which is greater than the gravitational pull exercised upon the stylus. Vertical movement control of the buoyant stylus may be exercised also by pressure variations of the carrier in a pressurized matrix using the Cartesian diver principle.

Figures 8, 10:
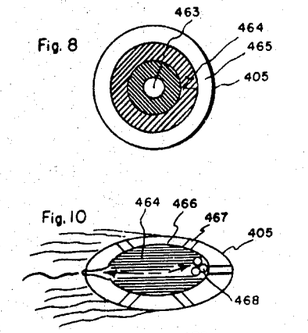
FIGS. 8 to 13 are perspective views of levitating styli.

In FIGURE 8 a glyph stylus is shown provided with a hollow permeable sphere 463 to keep it buoyant, enveloped in an ink reservoir 464, having an outer permeable membrane separating it from the outer layer 465 of porous material permitting rapid seepage of the ink out of the stylus during its movements.

Figures 9, 11:
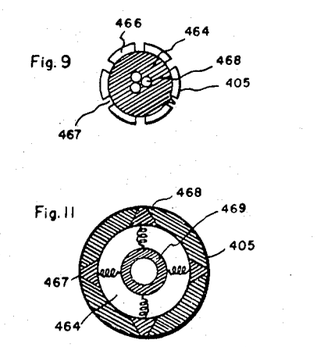

In FIGURES 9 and 10 the stylus is represented by a soft-walled sphere having an ink reservoir 464 with a plastic buoyant wall 466 provided with a plurality of spaced capillary orifices 467 or with a porous surface. One or more magnetic or magnetically permeable bodies 468 are enclosed within the ink-reservoir. The magnetic repulsion or attraction will push or pull the bodies into the leading orifice, thus elongating and deforming the stylus body as shown in FIGURE 10 and exerting pressure upon the ink to force it out as a trailing web. In the alternative the ink itself may be magnetically permeable or may contain a magnetic composition so as to be directly subject to expulsion by magnetic forces.

In FIG. 11 stylus 405 is shown as a hollow sphere of magnetically non-permeable material provided with orifices in the form of valve-seats, into which fit valves 468a of magnetically permeable material spring-loaded to an inner hollow sphere 469, also made of magnetically permeable material. The ink reservoir occupies the space in between the two spheres, and the ink is under pressure, provided for instance by a chemical propellant, already discussed with reference to FIG. 3. Magnetic repulsion will exert a primary force upon the magnetically-permeable material forcing the nearest valve to open and thus to release an ink trace. A change in direction closes the valve to open another valve nearest to the force of repulsion. The combined resistance of the springs and of the inner pressure of the pressurized ink reservoir must be smaller than the force of the magnetic repulsion exerted upon the stylus against the shear resistance of the glyph supporting mass.

Figure 12:
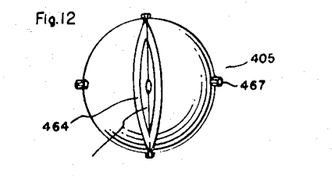

FIG. 12 indicates a preferred distribution of the orifices 467 on the outer shell of the styli shown in FIGS. 9 and 11.

Figure 13:
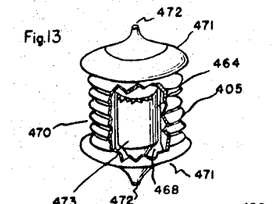

The levitating stylus shown in FIG. 13 has cylindrical Sylphon-type bellows 470 of a magnetically non-permeable material having cone-like closures 471 of magnetic or of magnetically permeable material, one at each end. Each closure has an orifice 472 provided with a valve seat, such as shown in the stylus of FIG. 11. Inside the stylus is shown a hollow cylinder core 473, which has conical ends fitting as valves into the valve seats. The space 464 between the cylinder core and bellows forms the ink-reservoir. The cylinder is of magnetically permeable material and is sufficiently short to prevent closing of both valve seats at the same time. Magnetic repulsion forces the cylinder away always to close the leading orifice of the stylus and to keep the trailing orifice of the stylus open. The trailing closure of the stylus by repulsion is being compressed against the shear resisting force of the carrier to compress the bellows to eject the ink. The cylinder core and one closure at a time during operation are in proximity while the other closure is separated from them as a body of smaller mass, thus insuring lining up of the leading and trailing orifices of stylus with the inductive field.

The matrix may have any desirable shape, such as a polyhedron, prism, pyramid, cone, plinth, double curved or warped surface, or cylinder. Graduations and index flaps along each coordinate axis, or any symbols providing a frame of references to guide in the production and or in the interpretation of the glyph may be drawn, printed, or affixed to or within the matrix itself.

A frame of references may be provided by incorporating into or adjacent to the matrix back-ground information for instance in the form of a three-dimensoional relief map, such as a previously produced "photo-glyph" described in the above cited copending patent application of the same name.

The walls of the matrix are preferably made of transparent glass, or hardened plastic such as methyl methacrylate.

In another embodiment of the invention, the matrix is made of a transparent high-density selfsealing plastic permitting penetration by a sharp glyph-stylus, such as equipped with a hypodermic needle. When the needle is withdrawn after deposition of a glyph forming medium in the glyph-carrier, the matrix wall reseals itself without deformation. High-density, selfsupporting, selfsealing plastics such as plasticized butyl rubber, transparent chlorinated rubber, or poly-iso-butylene of a molecular weight less than 100,000 are suitable for this purpose.

A glyph carrier to support the record in the container in one of its simplest forms, is pharmaceutical gelatine. A glyph carrier during glyph-production must be sufficiently fluid to permit movements of a stylus within it.

The glyph carrier may be solidified during or after completion of the glyph, to freeze the glyph therein into a permanent record by methods well known to the art.

Another example of a glyph carrier is an organic polymer formed from difunctional units such as vinyl acetate, or styrene workable at 125° C. At room temperature it is tough, but still sufficiently soft and plastic to be useful in glyph production. It will yield to stylus movements under a continuous force which is stronger than its shear resistance.

Other examples of materials which meet the requirements upon glyph carriers in accordance with this embodiment of the invention, namely, which have light transmitting properties and which are changeable from fluid to solid state with controllable intermediate viscosities are naturally occurring substances such as:

Gum arabic, rosins, low-melting waxes.

Synthetic materials such as: Coumarone indene resin, hydrogenated coumarone indene resins, and coumarone indene resins modified, for instance, with phenol or with cresylic acid. Alcohol soluble terpine resins.

Vinyl resins, vinyl butyrate resins soluble in alcohol, vinyl chloride resins soluble in ketones and esters, vinyl chloride acetate resins.

Methyl methacrylate polymer soluble in ketones, esters and aromatic hydrocarbons.

Polystyrene and styrene co-polymers soluble in aromatic and chlorinated hydrocarbons.

Resins from rosins, sols.

Gels such as gelatin, polyvinyl alcohol, silica gels.

Silicone polymers.

The viscosities of the glyph carriers are controlled by well known methods either in accordance with their respective thermo-plastic, the thermo-setting, or coagulating properties or by organic solvents. The above materials are commercially available with the desirable properties with respect to light transmission, viscosity, cone penetration, needle penetration, and ductility in accordance to the standards of the American Society for Testing Materials. Thus materials best suitable for particular purposes desired may be selected to meet the requirements of specific cases from a wide variety of available known commercial products. In some instances the viscosity of the glyph carrier preferably is controlled to cooperate also with the movements of the stylus shown in the embodiment of the invention of FIGURE 7. Thus during glyph-formation viscosity of the glyph carriers may be selected simultaneously to function as a controllable damping medium and interference to the speed of the stylus movements.

In an alternative embodiment of the invention one species of the matrix described above as having walls made of high-density self-supporting poly-iso-butylene may be combined with a glyph carrier of the same material in one body. This is preferable, for instance, when the glyph production is to be achieved by the insertion of small bodies such as markers in a specific glyph-configuration.

In such an instance the walls are made of poly-iso-butylene of a self-supporting molecular weight 100,000, the interior, however, while of the same elastomeric transparent material will have a molecular weight, for instance, of 25,000 up, that is non-supporting by itself, however, is still capable of supporting a glyph forming medium.

The quality of the material necessary to permit penetration depends on the thickness of the wall, on the sharpness of the stylus point, on the elasticity of the material, that is on its capability to recover from distortion or deformation caused by the stylus and to return to its original shape.

A hardness of the matrix wall and of the glyph carrier below 1 of the Mohs hardness scale is suitable when the stylus point has the conventional dimensions of any size hypodermic needle.

The optimum hardness should be determined experimentally in each case.

The poly-iso-butylene matrix and glyph carriers are preferable also when it is desired to use a sharp pointed measuring stick to evaluate the completed glyph, or if the location of the glyph forming medium is to be changed or it should be withdrawn. In the latter instance magnetized or permeable glyph forming particles are preferable, so that they may be withdrawn by a stylus with a magnetic point, or by electro-magnetic forces.

It is known to the art of rheology that the viscosity of certain fluids, such as of silicones, may be increased to a point where its character is non-Newtonian and where the liquid will keep a body fixed in space, independently of its buoyancy, and of its motional forces, which are lesser than the shearing stress of the liquid. Thus the body will move in response to a force only, which is greater than the shear resistance of the supporting viscous liquid.

In a book by Robert Roy McGregor on "Silicones and Their Use," Mellon Institute, Pittsburgh, Pa., pages 203, 1, 4, there are described such effects of viscosity with reference to silicones. Utilizing the shearing stress resistance of these plastics the movements of the stylus in the embodiment of the invention shown in FIG. 7 may be damped and controlled by controlling the viscosity of the carrier. The viscosity of thermoplastic carriers may be controlled by incorporating into the glyph matrix housing temperature control means. Some other plastics may have their viscosity controlled by solvents, etc., in manners specific to the plastic selected, by means well known to the art.

The glyph-producing medium may be chosen from various materials, compatible with the carrier selected. It may be a physical body, such as a web, wire, dust particles, pigments, permeable or magnetic particles, inks, paints, materials reacting or combining with the carrier selected chemically, thermally or optically or any other substance capable of leaving a visible trace, including a light ray to expose a photo-sensitive carrier.

In the selection care must be taken that the molecular weight of the glyph-forming medium equals that of the glyph carrier during application. When a water soluble carrier is used, the glyph forming medium preferably will be either water non-soluble to prevent spreading within the carrier, or it will be dispensed in minute quantities, just sufficient to leave the required trace, while spread. The viscosity of the carrier must be sufficiently high to retain the glyph-forming medium in the position into which it has been put there. The same material which is selected as a glyph carrier in a transparent state, colored as a rule is suitable as a glyph forming medium in it. Other materials suitable as glyph forming media are, for instance: vinyl resins with plasticizers, acrylics, dyes, India ink.

The molecular weight, the surface tension, the wetting properties and the viscosity of the glyph carrier and of the glyph forming means are selected to cooperate.

The ink compositions which preferably are used in the stylus of the present invention are in general, emulsions containing an inorganic pigment or an organic insoluble dyestuff, which is suspended in an oil phase, but which pigment or dyestuff, insoluble inorganic pigment or insoluble organic dyestuff, is treated with a stabilizing agent in an aqueous solution to leave a residue of stabilizing film thereon. As an example, utilizing a white pigment such as titanium dioxide, an ionic wetting agent such as a high molecular weight poly-glycol ether of a polyhydric alcohol such as sorbitol may be used. Another effective anionic wetting agent which may be used is the condensation part resulting from the addition of 10 to 12 moles of ethylene oxide to a molecule of diodecyl alcohol.

This same wetting function is obtained from complex compounds of the Werner type, in which trivalent nuclear chromium atoms are coordinated with organic acido groups. These compounds, as shown in U.S. Patent No. 2,544,668, particularly when mixed with a small amount of an emulsion of a polyester, provide a desirable protective film to aid dispersion of the pigment and at the same time prevent bleeding of the color in the areas which have been indicated in the three-dimensional product.

The oil phase preferably comprises a mixture of higher molecular weight fatty acid esters, or saturated fatty acid esters, such as ethyl or methyl stearate, ethyl laurate, butyl laurate, and the like, to which is added a thickening agent and a non-compatibilizing agent such as ethylene glycol, or liquid poly-glycols which are polymers of ethylene glycol, propylene, etc. These glycols which are aliphatic in nature serve the function of preventing the bleeding of the pigment and oil into the solid polymeric matrix.

The proportion of the glycol which is used depends upon the nature of the carrier. Where the carrier is a polymer or copolymer of an unsaturated polymerizable monomer such as methyl methacrylate and a polyester, a higher proportion of the glycol is used whereas with gelatin, a higher proportion of the oil is used. With gelatin about 80% of oil is used. For the synthetic polymer, about 50% of the oil phase is the glycol. The thickener may be carboxymethylcellulose, natural resins and gums, Irish moss, kaolin. Preferably about 5% of a thickener may be used.

Thus the properties of the carrier and of the glyph forming means respectively must be considered in their selection, so that the ink does not contract into globules, or does not sink, or float, or spreads within the carrier by physcial dispersion or chemical reaction.

An alternative method of carrying out a glyph production is the creation of a solid body having channels within it. Said channels, for instance, being the result and record of outward transient phenomena, such as sound.

Into a matrix filled with a glyph carrier of the solidifiable type glyph traces are introduced by any of the methods herein elsewhere described by using a colloidal suspension of fine ferro-magnetic or high-dielectric particles for instance in a silicone oil. By subjecting the suspension to magnetic or electric fields, until the glyph carrier solidifies, the viscosity and shear resistance of the suspension is converted into an almost solid state. After solidification the cuting off of the magnetic or electric field releases the suspension to its fluid state, making it possible to drain it from the solidified body. This is a novel alternative to the "lost wax method," and an improvement over it, since the hollow channels do not need to be premated, but may be the result of recording a plurality of transient phenomena.

A glyph may be created by forcing air or other gases, or foams through a glyph carrier in a continuous stream controllably originated from a glyph stylus. In such an instance the glyph carrier must be of a viscosity sufficiently high and of an ability to solidify sufficiently fast to retain the air forced therein in its original location. By these methods a hollow glyph trace can be created within the matrix, to function later as a three-dimensional glyph circuitry, if filled with electro-conductive material, or as a three-dimensional electronic tube, or for other purposes.

Figure 14:
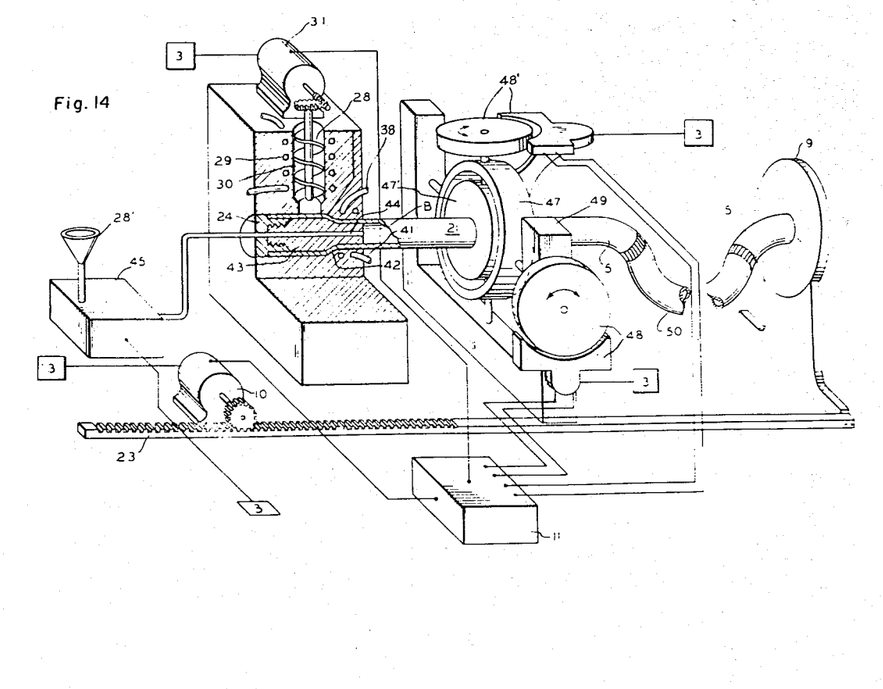
FIG. 14 is a perspective view of a mechanically operated glyph apparatus for charting a plurality of correlated phenomena.

The apparatus shown in FIG. 14 illustrates another possibility of carrying out the method of the present invention. It shows a horizontal method of recording although it is not restricted to such. This apparatus is primarily designed for the recording of continuous phenomena together with interrelated occasional phenomena. The glyph-forming head uses a gimbal mechanism mounted in frame 49, capable of universal movements within the limits of the recording space. The outer gimbal ring 47, controlled by servomotor 48 is mounted for angular movements about a horizontal axis, and the inner gimbal ring 47', controlled by servomotor 48', is mounted for movements about a vertical axis. The servomotors shown are of the electro-magnetic rotor-stator type. The servomotor 48' is mounted on the outer gimbal ring 47 and moves with it. The inner gimbal ring 47' has a central opening through which the web 21 proceeds and where it is deviated horizontally and vertically by the combined action of the two gimbal rings. The formed glyph is carried away from the recording head in the direction of the recording axis preferably by carrier 9, at a speed controlled by rack 23 through carrier control 10. The web is fabricated during recording in the form of a transparent tube by an extruder 30, receiving the glyph-forming material from one or more funnels 28 and controlled by material-advance control 31. The extruder is positioned in preheating coils 29. The plasticized material is extruded into a tubular chamber 42, the inner walls of which are defined by a die 43, threaded into the frame of the apparatus 24, to form a tube. Said die is centered within the tubular channel and has a central bore 44 connected by a tube to phenomena propagating mechanism, such as an extruder, pump, injector or equivalent, indicated by numeral 45. Such a mechanism may have its own material advance control, starting with a funnel 28' and continuing with features substantially as described above with reference to numeral 28 in FIGURE 4. Each of the main recording elements, that is the carrier, the two gimbal controls, the tubular extruder, and the mechanism 45 are actuated by separate servos 3, and the motion of some of these elements may be synchronized at 11, if necessary. The occasional phenomenon to be recorded is connected through its servo with the injection apparatus 45. The chamber 42 may be positioned within a coil 41 which circulates a medium for fixing the formed tube before recording such as precooling through inlet 38. The glyph material is advanced in a plasticized state through the extruder 30 to form the transparent glyph-web in the form of a tube. The tube, precooled by cooling coils 41, retains a deformability sufficient to yield to the shaping deviations of the gimbal system. Simultaneously, the mechanism 45, which is controlled by another servomotor, occasionally injects or extrudes into the tube through conduit 44 another material sufficiently dark to make it visible against the transparent tube. The continuous glyph together with its inside record is then carried away by the carrier into the recording space. Thus additional phenomena may be recorded simultaneously for correlation with one another. Also, several recording heads may record simultaneously in the same recording space side by side or along parallel axes. The cross section of the glyph may be of any desirable form, size or shape. Means may be incorporated to change the cross section during recording in response to variable phenomena.

The apparatus 45 in FIG. 14 may be an acoustic source, propagating sound vibrations or compression waves through the tube. The beginning of the tube optionally may be sealed off. Normally, the carrier 9 has a central opening, keeping the orifice of the tube open. Sound vibrations or compression waves initiated at 45 pass through the tube, leaving reliefs on its inner and outer surfaces while the tube is still in a plastic condition during precooling at 41. Thus the tube surface constitutes a record of sound vibrations standing or moving or of compression waves passing therethrough. The gimbals may remain inactive or may be eliminated entirely. Such recording is useful also in a novel sound investigation and in supersonic research.

Circuit printing electro-conductive paints, or webs may be used to produce three-dimensional electrical networks, whereby the glyph carrier is to be selected with electricity insulating properties. By using the glyph method for printing three-dimensional electric circuits, otherwise inaccessible, critical interior leads may be created.

The apparatus of FIGS. 1, 4, 5 and 7 are useful for the optical and photographic recording by virtue of the fact that the recording medium may be a photographic or photosensitive emulsion. Such emulsions are not limited to silver halide emulsions and there may be employed instead, for example, synthetic resins which are known to be photosensitive and which will leave a trace after they are converted from a fluid state to a completely hardened state. An example of such emulsion is a copolymer of a polyester such as that obtained from a polybasic acid and a polyhydric alcohol, with a polymerizable vinyl derivative such as styrene, vinyl acetate or the like. These materials, as shown in U.S. Patent 2,673,-

151 dated March 23, 1954, may be sensitized with certain sulphur sensitizers. In the presence of these sensitizers such as tetramethyl thiuram tetrasulphide, and a catalyst for the polymerization of the mixture of monomer materials, such as tertiary butyl hydro-peroxide, the resin assumes a hardened thermoset state in which it is highly durable and insoluble at the portions where it is struck by light.

In accordance with the present invention, the light sensitizer, the sulphide material, is traced by the stylus after it is emitted therefrom. The entire container is exposed to strong light, such as light from a carbon arc or sunlight, and after five minutes to one hour, there is a hardening of the resin which is observed in the areas where the sensitizer has been emitted by the stylus. After baking for a short time to gel the resin, the unhardened portions can be washed away and there is obtained a relief image of the trace of the stylus.

By employing an ink or coloring material with the sensitizer, there may be obtained colored effects to outline in greater detail the portions which have been scribed in three dimensions. Alternatively, if it is not desired to produce the relief effect mentioned in the previous paragraph, the use of the dye in combination with the sensitizer permits an after-baking of the gelled resin in the matrix at temperatures of about 250° F. for one-half hour during which time the product is cured to a hard, plastic body. Since the product itself is transparent and the scribed materials are not transparent, there is obtained thereby a permanent record in three dimensions.

In similar manner, other plastic materials may be employed. For example, as shown in U.S. Patent 2,687,958, polyacrylic acid amide may be hardened by the action of light in sensitized areas containing 4,4'-diazo, 2,2'-stilbene disulformic acid. A further example are products prepared from polyvinyl alcohol such as shown in Minsk U.S. Patents 2,610,120, 2,670,285, 2,670,286, 2,670,287 and Martinson U.S. Patent 2,697,039.

The above compositions are sensitized with cinnamic acid esters and which may be further sensitized with quinones, anthrones, and triphenolmethane compounds.

The value of these polyvinyl alcohol modified materials as described in the previous paragraph is that the material may become ink repellent in the presence of moisture by treatment with an aqueous oxidizing agent like potassium permanganate and or the exposed portions may be given a controlled degree of water receptivity. Thus, advantage may be taken of the improved water receptivity of the exposed portions to use water soluble pigments or dyes which adhere preferentially to the water receptive areas. The ink receptive areas may be colored in a different color by using a greasy ink. In this way, it is possible to provide different colored areas simultaneously to bring out in greater detail the scribing of the record in three dimensions.

An optically transient glyph representation may be produced by the methods of the present invention within a transparent matrix with a levitating stylus, such as shown in FIGS. 8 to 13, motivated by the above cited Linear Motor system. The stylus may be of very small dimensions instead, ranging down to an approximation of an artificial molecule of a few angstroms.

The stylus may be coated with a directly phosphorescent or luminescent material, or with a material which will phosphoresce or luminesce by reacting with a selected glyph carrier, or may comprise radio-active materials. In the copending above cited patent application on Linear Motor system, a follow-up mechanism is demonstrated and shown there in FIGS. 5 and 5a, which keeps the moving stylus illuminated by an outside source of light for tracking purposes. This source of light may be optionally X-rays or other radiations, which will cause illumination of a stylus cooperatively coated. A zinc-sulphide coated stylus, f.i., will fluoresce upon radiation by electrons, as demonstrated f.i. in U.S. Patent No. 1,962,873 of June 12, 1934.

A levitating stylus coated with a polynuclear aromatic hydrocarbon will emit light when exposed to an ionizing radiation in a liquid carrier containing a liquid hydrocarbon solvent. This is described in U.S. Patent No. 2,698,906.

A levitating stylus coated with a fluorescent material such as zinc silicate will luminesce in a transparent evacuated matrix containing a mixture of rare gases, such as neon, argon, hydrogen, sulphide or krypton, a small globule of mercury and phosphor in powdered form. See U.S. Patent No. 2,449,880.

Other materials are known to the art, such as organic fluorescent dyes and fluorescent pigments, which will emit light in response to fluorescigenous radiations, which may be employed for the purposes of this invention as a stylus coating, or a portion of it, to produce a transient trace by a levitating stylus either alone or by reaction with a cooperative glyph carrier containing material complementary to such a reaction, or which will respond to a suitable radiation directed upon the stylus for instance, from the follow-up system described in the above cited copending patent application on Linear Motor system and shown there in FIGS. 5 and 5a in detail.

A ball-type stylus immersed in a matrix charged with a transparent damping fluid and provided with any of the above discussed means to show the movements of the stylus or its path in a luminescent or phosphorescent manner may serve as a three-dimensional indicator of transient phenomena, for instance on an airplane dash-board, in a novel three-dimensional television representation, etc.

The present specification describes examples of the invention for the purposes of the disclosure. It is, however, intended to cover all changes, modifications and combinations of the embodiments shown, and combinations of the present invention with those disclosed in the above cited copending patent applications, which do not depart from the spirit and scope of the invention as claimed.

I claim:

1. An apparatus for producing three-dimensional glyph traces, comprising, a container, a volume of viscous fluid in said container, first means comprising a solid part within said container and universally movable in and through said fluid therein and operable to selectively generate glyph traces therein, and second means operable to positively control and selectively move said part in three mutually normal directions within said fluid to generate said glyph traces therein.

2. The apparatus of claim 1, said part being located entirely within said fluid.

3. An apparatus for producing three-dimensional glyph traces, comprising, a pressure-tight container, a volume of transparent viscous medium in said container, said medium including a photo-sensitive material and at least two sets of globules, each said set carrying photo-sensitive processing materials, each said set of globules being dispersed in said medium, a first set of said globules being charged with a developer, the second of said sets of globules being charged with a fixer of said photo-sensitive material, the surface strength of each successive set of said globules being proportionally higher than that of the preceding set of said globules, in the order in which the photo-processing materials are to be applied to said photo-sensitive material after exposure, first means comprising a part universally movable in and through said medium and operable to generate selective radiations capable of exposing said photo-sensitive material, second means operable to positively control and selectively move said part in three dimensions within said medium to generate said glyph traces therein, and means to create a sequence of pressures within said container, increasing in proportion to the increased surface strength of each successive set of globules to cause their rupture in said medium in photo-processing succession after exposure.

4. An apparatus for producing three-dimensional glyph traces, comprising, a transparent container, a volume of viscous transparent fluid in said container, a stylus universally movable in and through said fluid and operable to carry and controllably dispense a trace-forming medium to selectively generate glyph traces in said fluid, and mechanism positively operating upon and guiding said stylus to move the same in and along a three-dimensional path in said fluid, universally relatively to said container.

5. The apparatus of claim 4, said transparent fluid being selected from a group of materials known as plastics, said trace-forming medium being selected from materials having physical and chemical properties related to the properties of said transparent fluid so as to remain in dispensed position within said fluid.

6. The apparatus of claim 4, said stylus being suspended within said medium for universal levitating movement therein, and including means responsive to electrical energy forces for control of its movements by electrical radiations, said mechanism being fixed with said container and energizable to generate electrical energy forces effective upon said responsive means to move said stylus along said three-dimensional path.

7. The apparatus of claim 6, said means responsive to electrical energy forces including an electro-conductive mass, and said mechanism fixed with said container comprising electromagnetic induction coils wound in series opposition to effect movement of said stylus by repulsion.

8. The apparatus of claim 6, said stylus including a mass responsive to magnetic energy, and said mechanism to generate electrical energy forces being magnetic energy means.

9. The apparatus of claim 6, said stylus comprising a dielectric mass, said mechanism to generate electrical energy forces comprising electro-static deflection plates.

10. The apparatus of claim 6, said stylus having a mass equal to the weight of said fluid displaced thereby, whereby said stylus is suspended within said fluid for universal movement in and along three mutually normal coordinate axes fixed with reference to said container.

11. The apparatus of claim 6, said mechanism being manually operable and including hand-guided means external of said container and connected with said stylus, said hand-guided means having a length at least equal to the vertical depth of said container.

12. The apparatus of claim 6, said stylus including a charge of ink composition, and means for expelling said ink composition under pressure, from said stylus.

13. The apparatus of claim 6, said stylus comprising an element moved by and in response to electric energy means, and being suspended within said container, said mechanism positively operating upon and guiding said stylus, including first, second, and third electrical energy means each energizable to generate mutually normal electric energy space fields of variable magnitude along the X, Y, and Z coordinate axes, respectively, said third electrical energy means, generating said space field along the Z axis, having an initial input of a magnitude proportional to the unbuoyed weight of said stylus, to support said stylus in vertical levitation, and means operable to supply current of variable magnitudes to each of said three electrical energy means, to thereby effect movements of said stylus in accordance with the resultant space field of said first, second, and third electrical energy means.

14. The apparatus of claim 6, said fluid permitting movement of said stylus therethrough, in and along a three-dimensional path, said stylus being operable to dispense therefrom, within and into said fluid, a glyph-forming material to produce a fixed trace of stylus movement in and along said path.

15. An apparatus for producing three-dimensional glyph traces, comprising, a container, a volume of viscous trace-supporting glyph carrier in said container, first means comprising a part universally movable in and through said carrier and at least one reservoir of a glyph-generating medium, there being at least one outlet from said reservoir to the interior of said container, through said part, and second means operable to positively control and selectively move said part in three dimensions within said carrier to generate said glyph traces therein.

16. An apparatus for producing three-dimensional glyph traces, comprising, a container, a volume of viscous medium in said container, first means comprising a force-field responsive stylus within said container for free levitating universal movements therein and operable to selectively generate glyph traces in said viscous medium, and second means comprising a plurality of field-force generating means effective upon said stylus to effect movements thereof universally in three dimensions within said container and said viscous medium therewithin.

17. An apparatus for producing three-dimensional glyph traces, comprising, a container, a volume of viscous carrier in said container, first means comprising (a) a writing device having free levitating universal movement within said container by and in response to field forces effective thereon, (b) a reservoir of trace-generating medium insoluble in said carrier and (c) means to expel trace-generating medium from said reservoir through said writing device into said carrier, and second means comprising a plurality of field-force generating means effective upon said writing device to move the same universally within said container and said carrier therewithin to generate said glyph traces in said carrier.

18. An apparatus for producing three-dimensional glyph traces, comprising, a container, a volume of viscous electro-insulating medium in said container and capable of solidification, first means comprising (a) a writing device responsive to magnetic field forces effective thereon and positioned within said container for free levitating universal movement therein, (b) a reservoir of electrically-conductive trace-generating material and (c) means to convey said material from said reservoir to said writing device and to dispense the same therefrom into said medium during movement of said writing device, and second means comprising a plurality of devices producing magnetic fields the resultant of which is effective upon, and controls said writing device to produce movement thereof to generate said glyph traces in said medium.

19. An apparatus for producing three-dimensional glyph traces, comprising, a container, a volume of viscous solidifiable trace carrier in said container, first means comprising (a) a part universally movable in and through said carrier, (b) a reservoir of a fluid trace-generating material capable of temporarily solidifying under exposure to an electric current and (c) means to convey said trace-generating material from said reservoir to said part and thence into said carrier, and second means operable to positively control and selectively move said part in three dimensions within said carrier, to generate said glyph traces therein, whereby after temporarily subjecting the generated traces to an electric current, a stable three-dimensional trace is produced in said carrier.

20. An apparatus for producing three-dimensional glyph traces, comprising, a container, a volume of viscous transparent photo-sensitive emulsion in said container and capable of hardening and resistance to solubility upon exposure to light, first means including photo-emulsion exposing means universally movable in and through said emulsion to generate traces therein, and second means operable to positively control and selectively move said first means in three dimensions within said emulsion to generate said glyph traces therein.

21. An apparatus for producing three-dimensional glyph traces, comprising, a container having transparent walls of plastic having a thickness and density enabling puncturing thereof by a sharp stylus point and also having capability of sealing a puncture so formed, on withdrawal of the stylus, a volume of transparent glyph carrier within said container and having a viscosity and shear resistance sufficient to keep glyph trace materials in fixed dispensed positions therein, first means comprising a sharp stylus point insertable through the walls of said container and universally movable in and through said carrier and operable to dispense glyph trace material therein, and second means operable to positively control and selectively move said stylus in three dimensions within said carrier to generate said glyph traces therein.

22. An apparatus for producing three-dimensional glyph traces, comprising, a container, a volume of viscous medium in said container, first means comprising a stylus universally movable in and through said medium and a reservoir of trace material in communication with said stylus, and operable to dispense trace material from said reservoir through said stylus, into said medium, second means comprising servo-mechanisms, and means connecting said servo-mechanisms with said stylus to positively and controllably move said stylus in respective ones of three mutually normal directions within said medium.

23. An apparatus for producing three-dimensional glyph traces, comprising, a transparent container, a volume of viscous medium in said container, a stylus universally movable in and through said medium, and comprising a dispensing orifice and an ink reservoir connected with said orifice, pressure means in communication with said reservoir, means to control the pressure in said reservoir to dispense ink from said orifice, and means to change the size of said orifice.

24. An apparatus for three-dimensional visual recording, comprising, a container, a volume of clear, gelatin-like medium in said container, a writing device adapted to move universally through said medium and to dispense therein fluid trace material, a reservoir adapted to contain trace material and in communication with said writing device, means directly effective on said writing device to move the same universally through said medium, and means operable to controllably expel from said writing device, trace material from said reservoir into said medium, as said writing device is moved therein.

25. The apparatus of claim 24, said container being a cylinder having a longitudinal axis, a piston fitting said cylinder for translation therein along said axis, and means connected with said piston to controllably translate the same to increase the volume of said cylinder containing said medium.

26. The method of glyph recording comprising positively guiding and directing a part along a three-dimensional path within a solidifiable transparent fluid carrier, causing said part to draw an opaque fluid trace as it moves in and along said path, and solidifying said carrier to fix said fluid trace in and with respect to said fluid carrier.

27. The method of claim 26, said drawing being effected manually.

28. The method of claim 26, said drawing being effected mechanically.

29. An apparatus for three-dimensional visual recording, comprising an enclosure having a volume of clear gelatin-like medium contained therein, a writing device supported by said enclosure and adapted to traverse the space defined by said enclosure containing said medium and deposit therein material insoluble in said medium, a reservoir of such material in communication with said writing device, means for moving said writing device through said medium, and means to cause said writing device to deposit said material in said medium as said writing device is moved, to produce a recording trace.

30. An apparatus for producing three-dimensional electrically-conductive traces, comprising, a container, a volume of electrically-insulating, trace-supporting fluid carrier in said container, first means within said container and including a nib universally movable within and relatively to said fluid carrier, a reservoir of electrically-conductive trace-generating medium in communication with said nib, and means to effect the controlled dispensing of said trace-generating medium from said reservoir, to and through said nib.

31. An apparatus for producing three-dimensional glyph traces, comprising, a container having therein a volume of fluid, trace-supporting glyph carrier, first means universally movable within said container and operable to selectively generate traces within said carrier, said first means including a reservoir of trace-generating medium and an outlet into said carrier from said reservoir, and second means operable to controllably move said outlet within said carrier and simultaneously to controllably dispense said trace-generating medium into said carrier, to thereby produce glyph traces selectively and universally in three dimensions in said carrier.

32. An apparatus for producing three-dimensional glyph traces, comprising, a container having therein a volume of fluid trace-supporting glyph carrier, first means operable to generate traces selectively and universally in three dimensions within said container and including a reservoir of a fluid, solidifiable, trace-generating medium and an outlet into said container from said reservoir, and second means operable to controllably move said outlet within said container and simultaneously to dispense said trace-generating medium into said carrier to produce glyph traces selectively and universally, in three dimensions, in said carrier container therewithin.

33. An apparatus for producing three-dimensional glyph traces, comprising, a container having therein a volume of fluid, trace-supporting glyph carrier of viscosity and solidifiability sufficient to preserve hollow traces formed therein, first means operable to generate traces selectively and universally in three dimensions within said container and including a reservoir of gas and an outlet into said container from said reservoir, and second means operable to controllably move said outlet within said container and simultaneously to dispense gas into said carrier to produce hollow glyph traces selectively and universally, in three dimensions, in said carrier contained therewithin.

34. An apparatus for producing three-dimensional traces and data display, comprising, a transparent container, a body moved by and in response to magnetic field forces effective thereon and positioned for universal movements within said container, said body carrying means emitting light in response to radiations incident thereon, a plurality of means for producing variable magnetic fields effective on said body to move the same in and along a three-dimensional path, and means to produce said radiations incident on said body during movements thereof.

35. A three-dimensional drawing and data display system comprising a transparent container, a volume of clear, gelatin-like medium filling said container, a manually-operable elongated writing device having a length greater than the depth of said container and including a nib and a reservoir in communication with said nib, a supply of trace material in said reservoir, and means operable selectively and controllably to expel trace material from said nib selectively and controllably with universal movement of said nib within said medium.

36. An apparatus for three-dimensional visual recording comprising an enclosure having a volume of clear gelatin-like medium contained therein, a writing device supported by said enclosure and adapted to traverse the space defined by said enclosure containing said medium and deposit therein material insoluble in said medium, a plurality of reservoirs of trace materials in communication with said writing device, each trace material having a color different from the others, and means for controllably selecting the dispensing of trace material of a particular color to produce a variably colored recording trace.

37. A recording apparatus for forming a three-dimensional glyph in a matrix, comprising, a container having an open top, a transparent fluid glyph carrier within said container, an elongated stylus having a dispensing aperture at its lower end and a length substantially equal to the vertical depth of said container, a reservoir of glyph-forming medium in communication with said aperture, guide means mounting said stylus over said container for manual guided movement in three mutually normal dimensions, means connected with said stylus for controllably moving said aperture in and through said carrier in said dimensions and simultaneously controllably dispensing traces of glyph-forming medium therein, said carrier and said medium cooperating to retain said medium immobile relatively to said carrier, as dispensed.

38. An apparatus for three-dimensional drawing and data recording, comprising, a container, a plurality of reservoirs each in communication with said container, each said reservoir containing a volume of transparent viscous fluid carrier of a color different from the others, whereby said container may be filled with a plurality of discrete layers each of a color different from contiguous layers, first means selectively and universally movable in and relatively to said container and operable to generate glyph traces in the carrier therewithin, and second means operable to positively and controllably so move said first means in three dimensions, in and relatively to said container.

39. A package for producing a manually-controlled trace in three dimensions, comprising, a container, a fluid, solidifiable carrier filling said container, a pen comprising an elongated conduit having a length substantially equal to the depth of said container, a handle including a reservoir for ink connected with said pen through said conduit and operable to positively control and universally move said pen in and through said fluid, to selectively generate glyph traces therein, and manually-controlled valve means in said conduit to control the flow of ink under pressure from said reservoir into said carrier.

40. The method of glyph recording comprising positively guiding and directing a part along a three-dimensional path within a solidifiable transparent fluid carrier causing said part to blow a hollow gas trace under pressure therein as it moves in and along said path, and solidifying said carrier to fix said hollow trace in and with respect to said fluid carrier.

41. The method of glyph recording an electric circuitry comprising positively guiding and directing a part along a three-dimensional path within a solidifiable fluid carrier causing said part to draw an electro-conductive trace therein as it moves in and along said path, and solidifying said carrier to fix said electroconductive trace in and with respect to said carrier.

42. The method of glyph recording an electric circuitry comprising positively guiding and directing at least one part along a three-dimensional path within a solidifiable fluid carrier, causing said at least one part to draw selectively electro-conductive traces and hollow gas traces therein as it moves in and along said path and solidifying said carrier to fix said traces in and with respect to said carrier.

References Cited by the Examiner
UNITED STATES PATENTS
3,178,714   4/1965   Felts _______________ 364—8

ROBERT F. WHITE, *Primary Examiner.*

L. S. SQUIRES, *Assistant Examiner.*